(12) United States Patent
Fleckenstein et al.

(10) Patent No.: US 11,473,612 B2
(45) Date of Patent: Oct. 18, 2022

(54) SECURING MEANS FOR SCREWS, AND MOUNTING UNIT

(71) Applicant: Arnold Umformtechnik GmbH & Co. KG, Forchtenberg-Ernsbach (DE)

(72) Inventors: Uwe Fleckenstein, Zweiflingen (DE); Markus Klotz, Zweiflingen-Tiefensall (DE)

(73) Assignee: Arnold Umformtechnik GmbH & Co. KG, Forchtenberg-Emsbach (DE)

( * ) Notice: Subject to any disclaimer, the term of this patent is extended or adjusted under 35 U.S.C. 154(b) by 34 days.

(21) Appl. No.: 16/761,680

(22) PCT Filed: Nov. 6, 2018

(86) PCT No.: PCT/EP2018/080241
§ 371 (c)(1),
(2) Date: May 5, 2020

(87) PCT Pub. No.: WO2019/091945
PCT Pub. Date: May 16, 2019

(65) Prior Publication Data
US 2021/0180640 A1    Jun. 17, 2021

(30) Foreign Application Priority Data

Nov. 7, 2017 (DE) .......................... 102017219724.2
Apr. 27, 2018 (DE) .......................... 202018002180.6

(51) Int. Cl.
*F16B 21/18* (2006.01)
*F16B 41/00* (2006.01)
*F16B 19/02* (2006.01)

(52) U.S. Cl.
CPC ............ *F16B 41/002* (2013.01); *F16B 19/02* (2013.01)

(58) Field of Classification Search
CPC ............................... F16B 41/002; F16B 19/02
USPC .................................................. 411/353, 918
See application file for complete search history.

(56) References Cited

U.S. PATENT DOCUMENTS

| | | | | |
|---|---|---|---|---|
| 2,244,976 A | * | 6/1941 | Tinnerman | F16B 21/075 24/619 |
| 3,027,670 A | * | 4/1962 | Kramer | A47G 33/004 411/521 |
| 3,217,584 A | * | 11/1965 | Amesbury | B21D 53/36 174/250 |
| 3,226,145 A | * | 12/1965 | Goldberg | F16B 37/043 411/521 |
| 4,133,245 A | * | 1/1979 | Ruihley | F16B 13/122 411/80.1 |
| 4,621,961 A | | 11/1986 | Gulistan | |

(Continued)

FOREIGN PATENT DOCUMENTS

CN    201390218 Y    1/2010
DE       955101       12/1956
(Continued)

*Primary Examiner* — Gary W Estremsky
(74) *Attorney, Agent, or Firm* — Boyle Fredrickson S.C.

(57) ABSTRACT

The invention relates to a securing means for a screw having an annular sleeve for insertion in a through-hole in a workpiece, characterized in that the annular sleeve is provided with at least one plate-like resilient tongue which extends from the annular sleeve and which projects in the direction toward a longitudinal center axis of the sleeve.

14 Claims, 9 Drawing Sheets

(56) References Cited

U.S. PATENT DOCUMENTS

| | | | | |
|---|---|---|---|---|
| 5,993,128 A * | 11/1999 | Mark | ............... | F16B 13/124 |
| | | | | 411/30 |
| 6,174,118 B1 * | 1/2001 | Rebers | ............... | F16B 39/14 |
| | | | | 411/352 |
| 6,223,226 B1 * | 4/2001 | Miyahara | ............ | H04L 67/327 |
| | | | | 709/239 |
| 6,379,063 B1 * | 4/2002 | Gutierrez | ............. | B42B 4/00 |
| | | | | 400/602 |
| 7,059,022 B2 * | 6/2006 | Yuta | ............... | B60R 13/011 |
| | | | | 24/297 |
| 8,202,031 B2 * | 6/2012 | Hartmann | ............ | F16B 41/002 |
| | | | | 411/383 |
| 8,210,784 B2 | 7/2012 | Hartmann | | |
| 9,482,322 B2 * | 11/2016 | Weikert | ............... | F16H 7/18 |
| 2002/0009351 A1 * | 1/2002 | Bondarowicz | ......... | F16B 21/18 |
| | | | | 411/353 |
| 2003/0108401 A1 * | 6/2003 | Agha | ............... | F16B 41/002 |
| | | | | 411/353 |
| 2004/0155162 A1 * | 8/2004 | Schneider | ............ | F16B 19/02 |
| | | | | 248/220.21 |
| 2010/0086376 A1 * | 4/2010 | McClure | ............ | F16B 19/1081 |
| | | | | 411/71 |
| 2014/0357137 A1 | 12/2014 | Sian et al. | | |
| 2018/0142714 A1 * | 5/2018 | Owens, II | ............ | F16B 5/0283 |
| 2019/0226507 A1 * | 7/2019 | Erpenbeck | ........... | F16B 5/0266 |

FOREIGN PATENT DOCUMENTS

| | | |
|---|---|---|
| EP | 2000681 | 12/2008 |
| EP | 2136088 A2 | 12/2009 |
| EP | 2278170 | 1/2011 |

\* cited by examiner

SECURING MEANS FOR SCREWS, AND MOUNTING UNIT

FIELD OF THE APPLICATION

The invention relates to a securing means for a screw having an annular sleeve for insertion in a through-hole in a workpiece. The invention also relates to a mounting unit having a screw, a bush and a securing means.

BACKGROUND

A securing means for a screw and a mounting unit having a screw and a securing means are intended to be improved by the invention with regard to a simple construction and an insensitivity to tolerances.

SUMMARY

To this end, there is provided according to the invention a securing means for screws having an annular sleeve for insertion in a through-hole in a workpiece, wherein the annular sleeve is provided with at least one plate-like resilient tongue which extends from the annular sleeve and which projects in the direction toward a longitudinal center axis of the sleeve.

Surprisingly, it is possible to achieve not only a simple, cost-effective construction but also a great insensitivity to tolerances as a result of a structurally very simple construction of a securing means having an annular sleeve having at least one plate-like resilient tongue. This is because a screw is prevented by means of the plate-like resilient tongue from moving out of a through-hole in an axial direction and at the same time the plate-like resilient tongue allows radial displaceability of the screw in the through-hole. Therefore, the screw is securely retained in the through-hole and at the same time the screw can be displaced in a radial direction inside the through-hole in order to be orientated so as to fit threaded holes in an additional workpiece. The securing means according to the invention is particularly extremely advantageous for securing hoods or covers. On the one hand, screws can be preassembled in through-holes and the hood or cover with the preassembled screws can then automatically be moved to an additional workpiece, for example a cylinder head, without any risk that the screws may fall out of the through-holes. As a result of the securing means according to the invention, the screws can then be displaced relative to the through-holes during assembly in a radial direction in order to compensate for tolerances. This is particularly highly advantageous when the hood or cover is intended to be fixed with a large number of screws. It cannot practically be excluded with reasonable expenditure that tolerances may occur between the position of the through-holes in the hood and the threaded holes in the workpiece, for example in the cylinder head. Such tolerances can be readily compensated for by means of the securing means according to the invention. For example, the through-hole can be provided in a sleeve which is then pressed or injected into a hood or a cover or another workpiece. The securing means then forms a mounting unit together with the bush and the screw.

In a development of the invention, the annular sleeve has a slot which is continuous from a first edge to a second edge.

The sleeve can thereby, for example, be constructed resiliently and be introduced into a through-hole with pre-tensioning. For example, the sleeve in the unloaded state has a greater diameter than the through-hole and the sleeve is compressed for assembly and, after it has been introduced into the through-hole, it is released again. The sleeve then springs back and retains its position in the through-hole by means of friction. The construction of the annular sleeve with a continuous slot, that is to say as a slotted sleeve, also allows tolerances of through-holes to be compensated for.

In a development of the invention, the annular sleeve has a portion which forms a closed ring.

If the securing means is intended to be used in sheet metal components with only a small thickness, a sufficiently high retention force in a through-hole of the sheet metal component can be achieved by means of a portion of the sleeve which is constructed as a closed ring. The securing means can then be pressed, for example, into the through-opening. An outer diameter of the securing means can then be selected to be slightly greater than an inner diameter of the through-opening in order to obtain a press-fit. The inner diameter of the through-opening and the outer diameter of the securing means can also differ in terms of the shape thereof in order to obtain a sufficient clamping action of the securing means in the through-opening.

In a development of the invention, three plate-like resilient tongues, in particular from 3 to 8 resilient tongues, are distributed uniformly over the circumference of the annular sleeve.

By means of three plate-like resilient tongues, a screw can be retained securely and in a uniformly loaded manner. It is particularly possible to retain the screw by means of three resilient tongues centrally relative to the through-hole, that is to say with a uniform spacing of the shaft of the screw relative to the walls of the through-hole. In this case, the resilient tongues can, for example, retain the screw either in that the threaded portion of the screw has a greater outer diameter than a threadless portion of the shaft of the screw, or the resilient tongues engage with the thread of the screw and thereby secure the screw in the through-hole. In the case of flatter components, in particular sheet metal components, more than three resilient tongues may have advantages.

In a development of the invention, the at least one plate-like resilient tongue extends from the annular sleeve initially parallel with the longitudinal center axis of the sleeve, then obliquely relative to the longitudinal center axis toward the longitudinal center axis and, at least up to a location just in front of the free end of the plate-like resilient tongue, again parallel with the longitudinal center axis.

It is thereby possible to introduce a screw readily into the securing means if the securing means, for example, is already mounted in a through-hole. The screw is inserted with the threaded portion thereof in front into the annular sleeve and then presses the plate-like resilient tongues apart in that it runs up against the region of the resilient tongues extending obliquely relative to the longitudinal center axis. The regions at the end of the plate-like resilient tongue which again extend parallel with the longitudinal center axis then ensure a uniform action on the screw shaft as a result of the resilient tongues. These regions of the plate-like resilient tongues which extend parallel with the longitudinal center axis extend from the obliquely extending portion at least as far as a location just in front of the free end of the plate-like resilient tongue.

Directly in front of the free end thereof, the plate-like resilient tongues can again extend obliquely relative to the longitudinal center axis away from it. It is thereby possible, for example, to achieve a V-shaped configuration of the end of the plate-like resilient tongues, with which it is then possible to engage in the thread turns of the screw.

In a development of the invention, the annular sleeve and the at least one resilient tongue are formed from a high-grade steel plate.

It is thereby possible to construct the securing means, on the one hand, resiliently and, on the other hand, also in a corrosion-resistant manner.

In a development of the invention, the at least one resilient tongue extends from a first edge of the sleeve and the sleeve is provided in the region of a second edge which is opposite the first edge with at least one projection which projects radially outwardly away from the longitudinal center axis.

By means of such a projection or by means of a plurality of such projections, the sleeve can be securely anchored in a through-hole. In this case, the projections are advantageously constructed in the form of obliquely radially outwardly bent sheet metal portions. These sheet metal portions then resiliently abut the inner wall of the through-hole and thereby secure the sleeve in the through-hole.

In a development of the invention, the annular sleeve is bent from a band-like material strip.

For example, the sleeve can be produced from a punched and pre-bent sheet metal strip and, depending on the diameter of the required sleeve, a piece of a suitable length is cut from the sheet metal strip. The sheet metal strip is then bent in that the resilient tongues already receive their intended shape and where applicable projections are bent out of the sleeve and then ensure a secure retention of the sleeve in the through-hole. The sheet metal strip portion is then bent to form the round sleeve and is then inserted in a through-hole in the bent state.

In a development of the invention, an intermediate space is located between the beginning and the end of the sheet metal strip in the finished state of the annular sleeve.

In this manner, there is produced a slotted sleeve which can have, on the one hand, a resilient effect so that it can be reliably mounted and secured in a through-hole. On the other hand, tolerances in the diameter of the through-hole can be compensated for with such a slotted sleeve.

In a development of the invention, the sleeve has a portion which forms a closed ring, wherein, when viewed in the direction of a longitudinal center axis of the ring, the at least one resilient tongue extends from the portion which forms the closed ring, and wherein a longitudinal extent of the resilient tongue is from one time to three times the length of the portion forming the closed ring.

In such comparatively short resilient tongues, the resilient action is smaller, but this can be compensated for, for example, by more than three resilient tongues. It is thereby also possible with such flat securing means which are provided, for example, for insertion in sheet metal components to obtain a high level of reliability.

In a development of the invention, two resilient tongues which are arranged beside each other in a circumferential direction are separated from each other by means of an incision in the sleeve.

It is thereby possible to construct the resilient tongues in a very simple manner. The incision can be introduced mechanically, for example by sawing or punching, or by initial forming, for example when the sleeve is produced with the resilient tongues as a plastics injection-molded component.

The problem addressed by the invention is also solved by a mounting unit having a screw, a bush and a securing means according to the invention, wherein the securing means is inserted in the bush and the screw extends at least partially into the bush and is retained in the bush by the securing means.

Such a mounting unit having a bush, securing means and screw can be supplied and, for example, be inserted automatically into through-holes of a hood or a cover which correspond to the bush. Naturally, it is also possible also to injection-mold the mounting unit during the production of the hood or cover or another workpiece. After the bush has been secured to the hood, the cover or the other workpiece, the screw is then securely retained on the hood, cover or other workpiece.

The problem addressed by the invention is also solved by a mounting unit having a screw, a sheet metal component and a securing means according to the invention, wherein the securing means and the screw are inserted in a through-opening of the sheet metal component.

Precisely with comparatively thin sheet metal components, for example with a thickness between 3 mm and 5 mm, or also in the case of thin plastics components, the securing means according to the invention can be used in a very advantageous manner.

Additional features and advantages of the invention will be appreciated from the claims and the following description of a preferred embodiment of the invention in connection with the drawings. Individual features which are illustrated in the drawings and/or described in the description can in this case be combined with each other freely without exceeding the scope of the invention.

DETAILED DESCRIPTION

Figure 1:
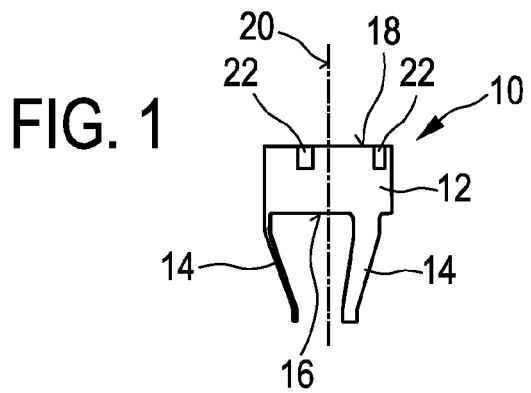
FIG. 1 is a side view of a securing means according to the invention.

The illustration of FIG. 1 shows a securing means 10 according to the invention. The securing means 10 has an annular sleeve 12 which is provided with a total of three plate-like resilient tongues 14, wherein only two of the resilient tongues 14 can be seen in the side view of FIG. 1. The annular sleeve 12 has a first edge 16 and a second edge 18 which is opposite the first edge 16. The two edges 16, 18 extend parallel with each other. The plate-like resilient tongues 14 extend from the first edge 16. A longitudinal center axis 20 of the annular sleeve 12 is indicated in FIG. 1 by means of a broken line.

The plate-like resilient tongues extend, as can best be seen with reference to the resilient tongue 14 illustrated on the left in FIG. 1, from the first edge 16 initially parallel with the longitudinal center axis 20 in order then to extend obliquely relative to the longitudinal center axis 20 toward the longitudinal center axis 20. A portion of the resilient tongue 14 which extends parallel with the longitudinal center axis and which then reaches as far as the free end of the plate-like resilient tongue 14 adjoins the obliquely extending portion again.

In the region of the second edge 18, three radially outwardly projecting projections 22 are provided, wherein only two of these projections can be seen in the illustration of FIG. 1. The projections 22 are produced by means of radially obliquely outwardly bent sheet metal tabs.

The securing means 10 is provided to be inserted into a through-hole. In the assembled state, the projections 22 abut an inner wall of the through-hole and ensure a secure retention of the securing means 10 in the through-hole.

The plate-like resilient tongues 14 are provided to abut the free end on the shaft of a screw with the end portion thereof and thereby to secure the screw.

Figure 2:
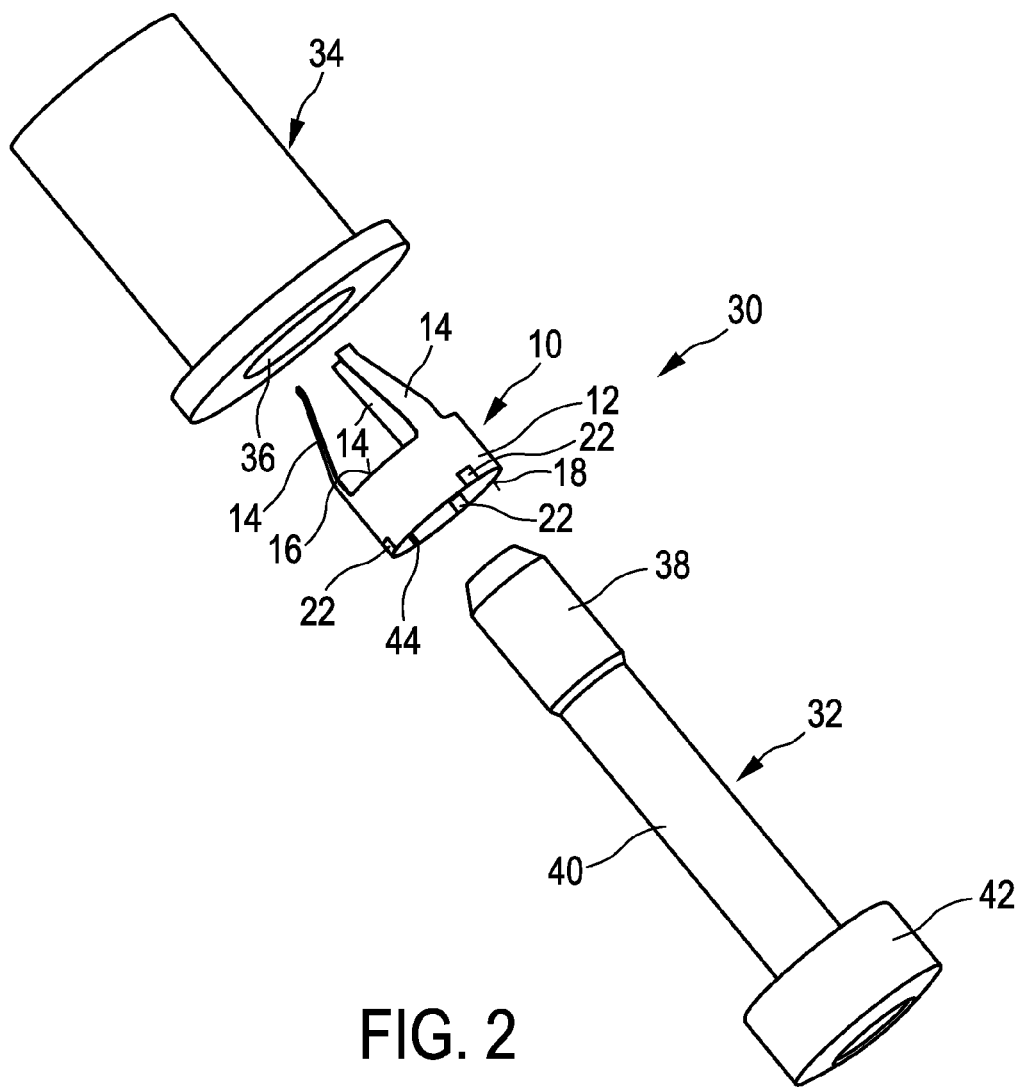
FIG. 2 is an exploded illustration of a mounting unit according to the invention with the securing means of FIG. 1.

FIG. 2 shows an exploded illustration of a mounting unit 30 according to the invention with the securing means 10 from FIG. 1. The mounting unit 30 has a screw 32, a securing means 10 and a bush 34. The securing means 10 is provided to be inserted in a cylindrical through-hole 36 of the bush 34. The screw 32 is then inserted with a threaded portion 38 at the front into the through-hole 36 and therefore into the securing means 10. In the assembled state, the resilient tongues 14 of the securing means 10 which then abut the shaft of the screw 32 prevent the screw 32 from falling out of the bush 34 again. In this case, the free ends of the resilient tongues 14 can abut a threadless portion 40 of the screw shaft of the screw 32 which extends between the thread 38 and a screw head 42. In a direction toward the bush 34, the screw 32 cannot fall out of the bush as a result of the screw head 42. In the opposite direction, the free ends of the resilient tongues 14 abut the beginning of the threaded portion 38 and thereby prevent the screw from falling out of the through-hole 36 of the bush 34. However, the free ends of the resilient tongues 14 can also be positioned on the thread 38. The screw 32 is also thereby retained in the through-hole 36 of the bush 34 by means of the resilient tongues 14.

FIG. 2 shows that the sleeve 12 is configured as a slotted sleeve and has a slot 44 which extends from the first edge 16 of the sleeve 12 as far as the second edge 18 of the sleeve 12. The slot 44 ensures that the annular sleeve 12 can spring back and be deflected to a degree. It is thereby possible, on the one hand, to compensate for tolerances of the inner diameter of the through-hole 36 and the sleeve 12 can also be compressed in order to be inserted in the through-hole 36. After springing back, the sleeve 12 then abuts the inner wall of the through-hole 36 with the outer periphery thereof and also with the projections 22 with resilient pretensioning. The securing means 10 can thereby be secured in the through-hole 36 of the bush 34.

Figure 3:
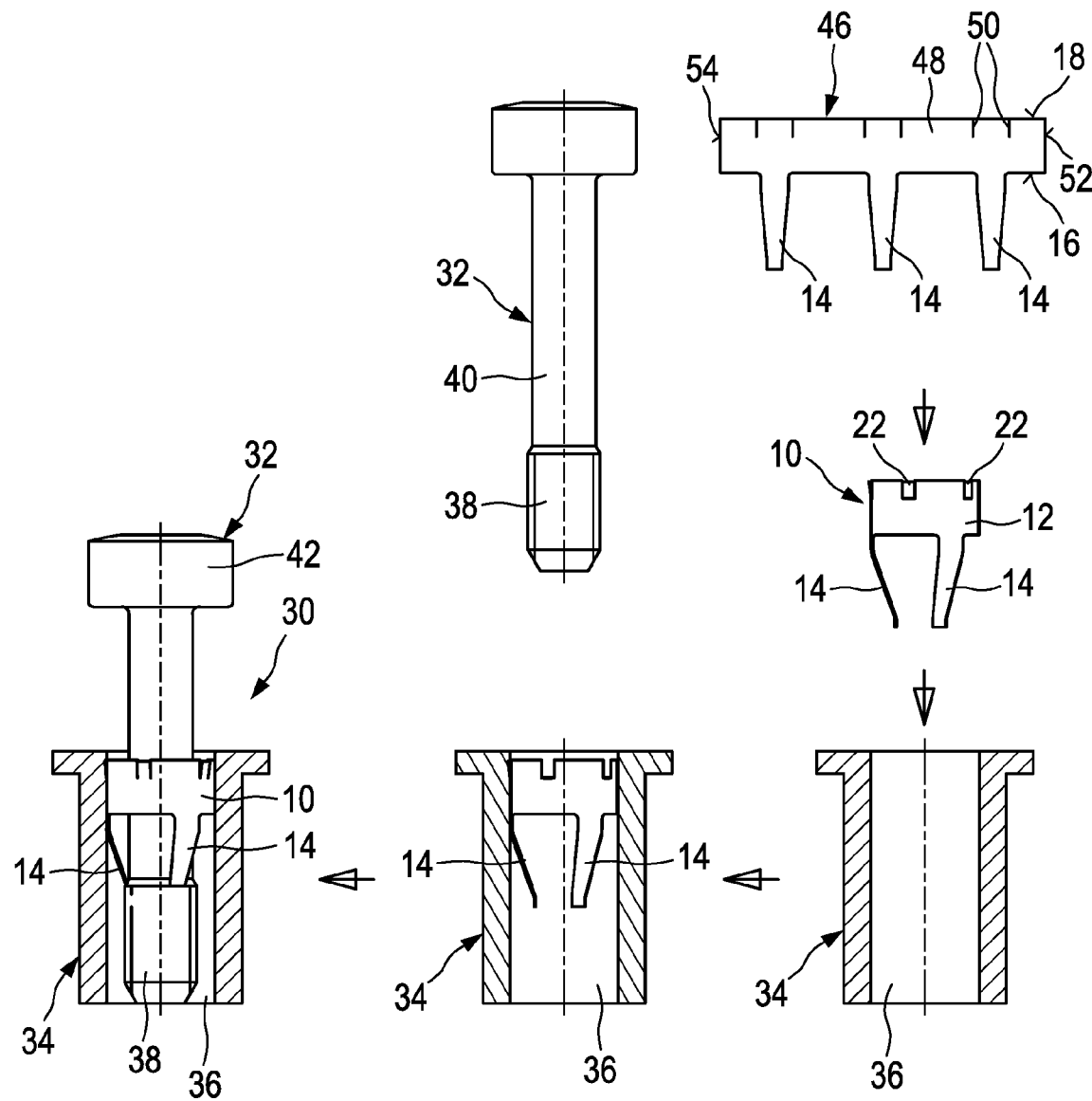
FIG. 3 is an illustration in order to explain the production of the mounting unit of FIG. 2.

The illustration of FIG. 3 shows the production of the mounting unit 30 of FIG. 2 in different operating steps. Initially, the securing means 10 is formed from a pre-punched and pre-bent sheet metal strip. This is carried out in that a portion 46 which has three resilient tongues 14 and a strip 48 which is then subsequently formed to form the annular sleeve 12 of the securing means 10 is separated from a longer sheet metal strip. The resilient tongues 14 extend from a first edge 16 of the strip 48 and the second edge 18 of the strip 48 is provided with a total of six incisions 50, wherein two incisions 50 then together define a projection 22 in the finished state of the securing means 10, respectively. The portion 46 is then pre-bent in such a manner that the resilient tongues 14 already receive their subsequent shape, particularly a first portion which extends parallel with the strip 48, then a portion which extends obliquely relative to the strip 48, and then again a portion which extends parallel with the strip 48 as far as the free end of the resilient tongues 14. The regions between the incisions 50 are bent away obliquely relative to the strip 48 so that the projections 22 in the finished state of the securing means 10 then extend radially obliquely outward.

The strip 48 is then bent in a circular manner so that the securing means 10 is produced. There is then still a small spacing which then forms the slot 44 in the sleeve 12 of the securing means 10, cf. FIG. 2, between the two ends 52, 54 of the strip 48 of the portion 46.

Subsequently, the securing means 10 is then inserted in the through-hole 36 of the bush 34, wherein the bush 34 is illustrated in cross-section. It has already been set out that the annular sleeve 12 is slightly compressed to this end and is therefore reduced in terms of outer diameter. After it has been introduced into the through-hole 36, the annular sleeve 12 then springs back so that the securing means 10 is securely retained in the through-hole 36.

Subsequently, the screw 32 with the threaded portion 38 at the front is introduced into the through-hole 36 of the bush 34. When the screw 32 is inserted, the front end of the screw presses the resilient tongues 14 radially outward so that the free ends of the resilient tongues 14 slide away over the threaded portion 38 and then after the end of the threaded portion 38 are again deflected inwardly and then abut the threadless portion 40 of the shaft of the screw 32.

The finished mounting unit 30 is shown in FIG. 3 on the very left. It can be seen that the resilient tongues 14 of the securing means 10 now prevent the screw 32 from falling out of the bush 34 in that the free ends of the resilient tongues 14 strike the head-side beginning of the threaded portion 38 of the screw 32. The screw 32 therefore cannot slip, at the top in FIG. 3, out of the through-hole 36 of the threaded bush 34. The head 42 of the screw prevents the screw from falling through the bush 34 in the opposite direction, therefore downward in FIG. 3.

The mounting unit 30 consequently has the screw 32, the securing means 10 and the bush 34, wherein the screw 32 is retained in a secure manner in the bush 34 by way of the securing means 10.

It is already possible to see from the finished mounting unit 30, which is illustrated on the very left in FIG. 3 as a partial cross-section, that the shaft of the screw and therefore also the threaded portion 38 of the screw 32 can be moved in a radial direction inside the through-hole 36. It is thereby possible to compensate for tolerances of the position of a mating thread in a workpiece.

Figure 4:
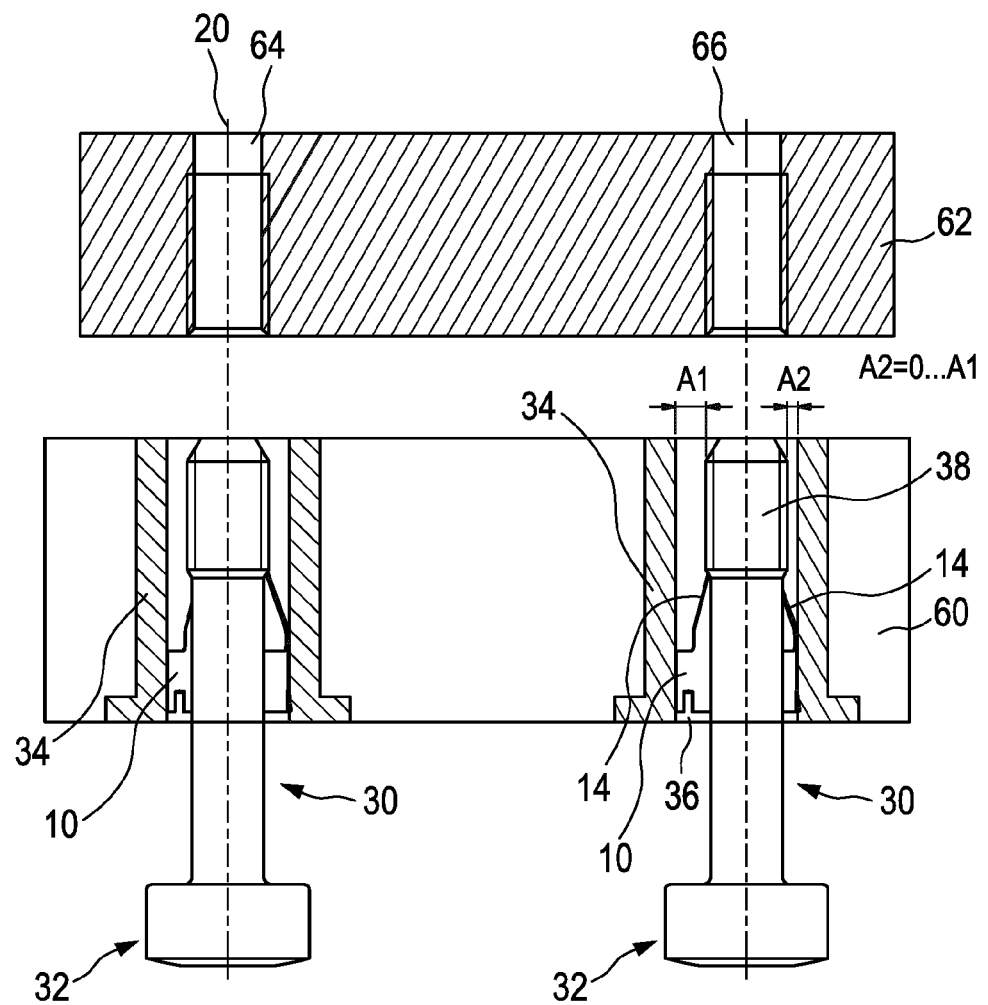
FIG. 4 is a partial cross-section of a first workpiece having two mounting units according to the invention and a second workpiece having two threaded holes.

FIG. 4 is an illustration with a first workpiece 60, in which two mounting units 30 according to the invention are inserted. The first workpiece 60 has to this end two stepped through-holes in which the respective bushes 34 are inserted in such a manner that an end of the bushes 34 facing the screw head of the screw 32 of the mounting units 30 is arranged flush with a surface of the first workpiece 60. An opposite end of the bushes 34 is also arranged flush with the associated surface of the workpiece 60.

A second workpiece 62 is provided with two threaded holes 64, 66. The first workpiece 60 is constructed, for example, as a cover or hood and the second workpiece 62 is constructed, for example, as a cylinder head. The illustration of FIG. 4 shows that the left mounting unit in FIG. 4 is now orientated relative to the left threaded hole 64 of the second workpiece 62 so that a longitudinal center axis 20 of the securing means 10, a longitudinal center axis of the screw 32, a longitudinal center axis of the bush 34 and a longitudinal center axis of the first threaded hole 64 coincide in the second workpiece 62.

However, a lateral spacing between the first threaded hole 64 and the second threaded hole 66 in the second workpiece 62 does not correspond precisely to the spacing of the longitudinal center axes of the left bush 34 and the right bush 34 in the first workpiece 60.

Particularly, a spacing of the longitudinal center axes of the two bushes 34 in the first workpiece 60 is smaller than a spacing of the longitudinal center axes of the two threaded holes 64, 66 in the second workpiece 62.

Since the screw 32 in the right bush 34 is retained by means of the resilient tongues 14 of the securing means 10, however, the screw 32 can be displaced in the illustration of FIG. 4 to the right inside the through-hole 36 of the bush 34 until the longitudinal center axis of the screw 32 is aligned with the longitudinal center axis of the second threaded hole 66 of the second workpiece 62. This lateral displacement of the screw shaft of the screw 32 inside the through-hole 36 of the right bush 34 can readily be seen in FIG. 4 in that the threaded portion 38 of the screw 32 has a spacing A2 from the right delimitation of the through-hole 36 of the bush 34 and has a spacing A1 from the left delimitation of the through-hole 36 of the bush 34, wherein A1 is greater than A2. Since the longitudinal center axes of the right screw 32 and the second threaded hole 66 are aligned, the screw 32 can readily be screwed with the threaded portion 38 thereof into the second threaded hole 66. At the same time, the left screw 32 in FIG. 4 can also be readily screwed into the first threaded hole 64 since the longitudinal center axes of the left screw 32 and the first threaded hole 64 are also aligned.

The securing means 10 according to the invention and the mounting units 30 according to the invention therefore allow the screws 32 to be arranged in the first workpiece 60 in a secure manner and at the same time allow tolerances to be compensated for between the threaded holes 64, 66 in the second workpiece 62 and the longitudinal center axes of the two bushes 34 in the first workpiece 60.

The securing means 10 according to the invention are further cost-effective to produce, easy to assemble and also ensure a reliable securing of the screws 32 in the bushes 34.

Figure 5:
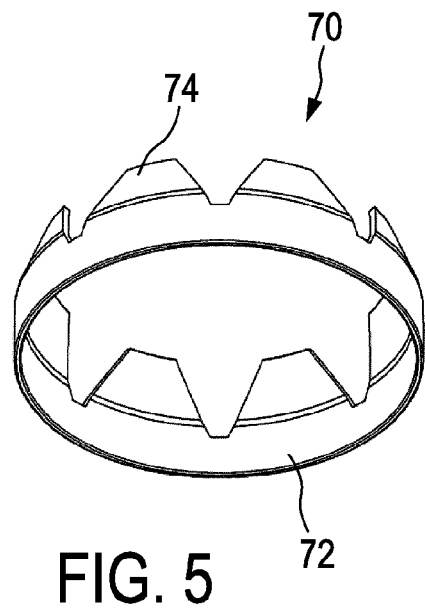
FIG. 5 is an oblique bottom view of a securing means according to the invention according to an additional embodiment.

FIG. 5 shows a securing means 70 according to the invention which has a first portion 72 in the form of a closed ring, from which a plurality of resilient tongues 74 extend. The resilient tongues 74 are separated from each other by V-shaped incisions and arranged spaced apart from each other uniformly in a circumferential direction of the securing means 70. The portion 72 which forms a closed ring is constructed cylindrically. The resilient tongues 74 are then bent away obliquely inwardly in the direction toward the longitudinal center axis of the portion 72. The resilient tongues 74 are each constructed in a approximately planar manner and are consequently formed by simple bending of a material portion.

The resilient tongues 74 each have a prism-like shape with two side edges which taper obliquely toward each other and an upper edge which extends in a circumferential direction. In total, eight resilient tongues 74 are arranged beside each other with uniform spacing in a circumferential direction.

Figure 8:
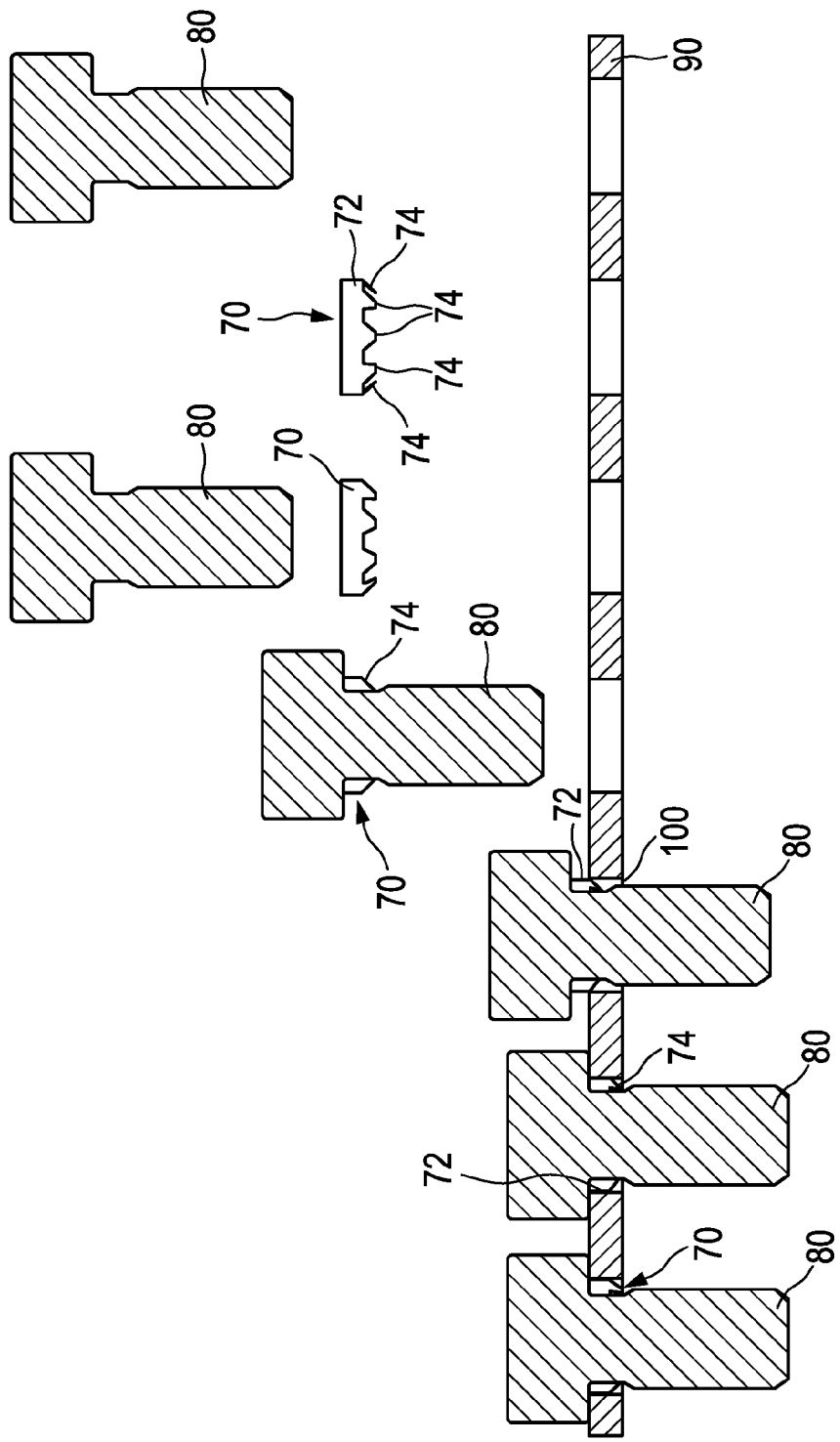
FIG. 8 is a schematic view of the steps during insertion of the securing means of FIG. 5 and a screw in through-openings of a sheet metal component.

The securing means 70 is provided to be inserted in sheet metal components with only a small thickness, cf. FIG. 8. As a result of the portion 72 which forms a closed ring, it is possible to obtain high clamping forces. For example, the portion 72 is pressed into a through-hole of a sheet metal component, the inner diameter of which is slightly smaller than the outer diameter of the portion 72. Alternatively, the portion 72 may also have a non-circular shape in order then to obtain a sufficiently high clamping action in a round through-opening of a sheet metal component.

Figure 6:
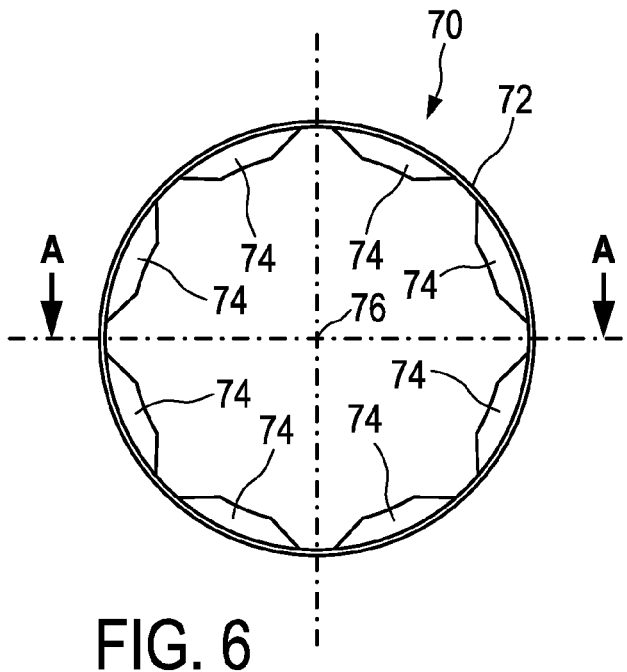
FIG. 6 is a plan view of the securing means of FIG. 5.

FIG. 6 shows the securing means 70 of FIG. 5 as a plan view. There can be seen the circular configuration of the portion 72 in the form of a cylindrical pipe and the resilient tongues 74 which are bent away inwardly toward a longitudinal center axis 76 of the portion 72.

Figure 7:
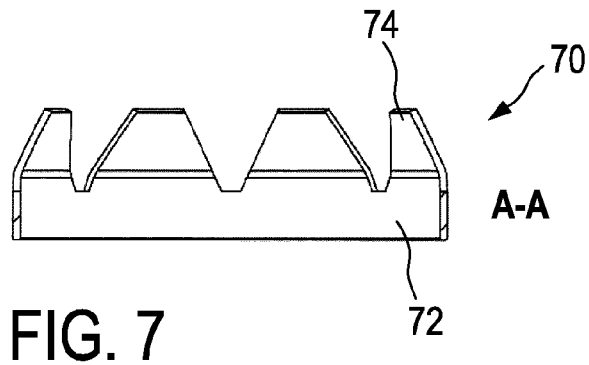
FIG. 7 is a view of the plane of section A-A in FIG. 6.

FIG. 7 shows a view of the plane of section A-A of the securing means 70 of FIG. 6.

The view of FIG. 7 clearly shows that, when viewed in the longitudinal direction of the longitudinal center axis 76, the resilient tongues 74 are approximately twice as long as the portion 72. In this manner, it is further possible to obtain an adequate resilient effect of the resilient tongues 74 and an adequate clamping action of the portion 72 for a small total height of the securing means 70 at the same time.

FIG. 8 shows different steps for forming a mounting unit from the securing means 70, a screw 80 and a sheet metal component 90 with a plurality of through-openings.

Initially, the securing means 70 is pushed onto the screw 80 until it abuts the lower side of a head of the screw 80. In this portion, adjoining the lower side of the head, the shaft of the screw 80 is not provided with a thread so that the outer diameter of the shaft in this region is smaller than in the region which is provided with a thread. The resilient tongues 74 abut the outer side of the shaft with the free ends thereof. The resilient tongues 74 thereby prevent the securing means 70 from again sliding downward in FIG. 8, over the threaded portion of the screw 80.

The screw 80 with the securing means 70 is then inserted into a through-opening 100 with the threaded portion at the front. In this case, the through-opening has a diameter which is greater than the outer diameter of the region of the screw 80 provided with a thread. As soon as the portion 72 of the securing means 70 reaches the upper delimitation of the through-opening 100, the movement of the screw 80 is initially stopped. The screw 80 can then be displaced further by a pressing force, with which the portion 72 is pressed into the through-opening 100, being applied. It has already been set out that the outer diameter of the portion 72 of the securing means 70 is slightly greater than the inner diameter of the through-opening 100. When the securing means 70 is pressed into the through-opening 100, a press-fit is thereby produced.

FIG. 8 shows the state of the securing means 70 pressed completely into the sheet metal component 90 in both illustrations at the left end of the sheet metal component 90. The ends of the resilient tongues 74 are located approximately at the height of the lower side of the sheet metal component 90 and the peripheral edge of the portion 72 opposite the resilient tongues 74 is arranged flush with the upper side of the sheet metal component 90. The securing means 70 prevents the screw 80 from being able to fall out of the through-opening 100 of the sheet metal component 90. However, the screw 80 can still readily be rotated in the through-opening 100, for example in order to be able to fix the sheet metal component 90 to an additional component with a threaded bush.

The screw 80 which is illustrated on the very left in FIG. 8 is displaced slightly to the left with respect to a position arranged concentrically relative to the through-opening 100. Such a radial displacement relative to the through-opening 100 is possible as a result of the securing means 70 according to the invention because the resilient tongues 74 can give way in a radial direction. A tolerance compensation is thereby possible as a result of the securing means 70 according to the invention.

Figure 9:
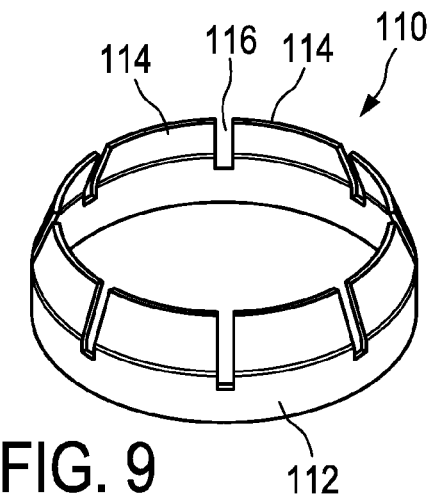
FIG. 9 is an oblique plan view of a securing means according to the invention according to an additional embodiment.

The illustration of FIG. 9 shows an additional securing means 110 according to the invention according to an additional embodiment of the invention. The securing means 110 has a portion 112 which forms a closed ring. A total of eight resilient tongues 114 which are uniformly spaced apart from each other in a circumferential direction of the securing means 110 are provided starting from the portion 112. The resilient tongues 114 are each separated from each other by rectangular incisions 116 and bent inward in the direction toward a longitudinal center axis of the portion 112. The resilient tongues 114 can be formed, for example, by simply sawing a pipe portion.

Figure 12:
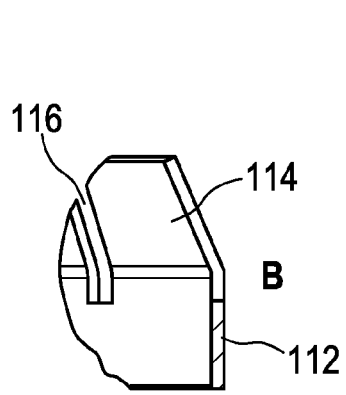
FIG. 12 is an illustration of the detail B from FIG. 11.

In this case, the incisions 116 extend beyond the bent-away portion of the resilient tongues 114, see also FIG. 12.

Figure 10:
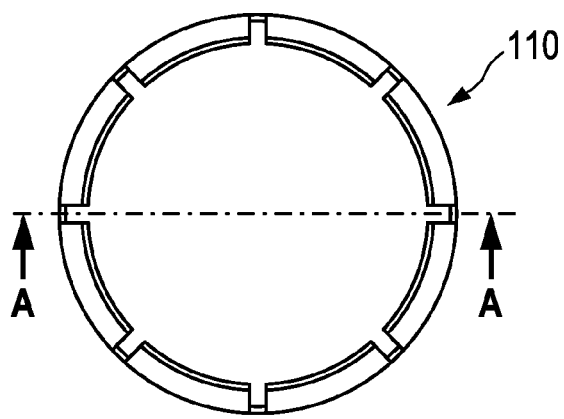
FIG. 10 is a plan view of the securing means of FIG. 9.
Figure 11:
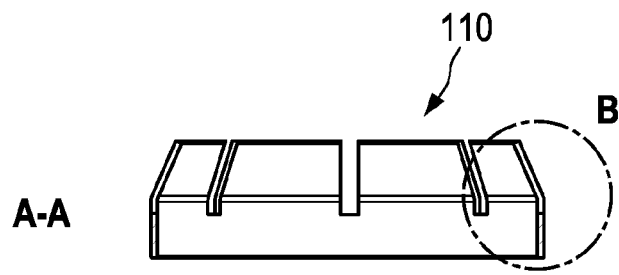
FIG. 11 is a view of the plane of section A-A in FIG. 10.

FIG. 10 shows a plan view of the securing means 110, FIG. 11 shows a view of the plane of section A-A in FIG. 10 and FIG. 12 shows the enlarged detail B from FIG. 11.

Figure 13:
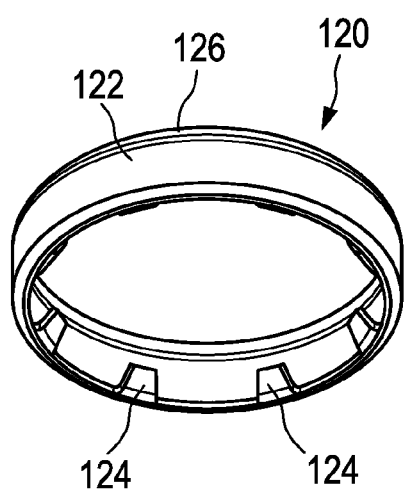
FIG. 13 is an oblique bottom view of a securing means according to the invention according to an additional embodiment of the invention.

FIG. 13 shows an additional securing means 120 according to an additional embodiment of the invention. The securing means 120 has a portion 122 which forms a closed ring. At an edge of the portion 122 located at the bottom in FIG. 13, a total of eight resilient tongues 124 which are bent away inwardly in the direction toward a longitudinal center axis of the portion 122 are provided.

However, the resilient tongues 124 are bent away by more than 90° in the case of the securing means 120 so that they extend upward again, see FIG. 13. Therefore, a screw would be introduced into the securing means 120 of FIG. 13 from below in an upward direction.

Figure 16:
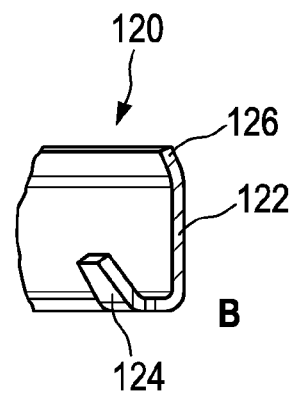
FIG. 16 shows the enlarged detail B from FIG. 15.

In order to make it easier to introduce or press the securing means 120 into a through-opening of a sheet metal component, an edge of the portion 122 which is opposite the resilient tongues 124 is bent away inwardly, see also FIG. 16. The edge 126 of the portion 122 thereby acts as an auxiliary introduction member when the securing means 124 is introduced or pressed in.

Figure 14:
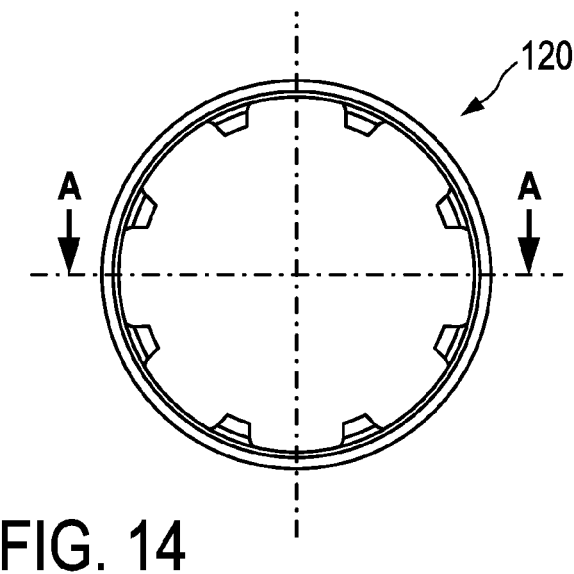
FIG. 14 is a plan view of the securing means of FIG. 13.
Figure 15:
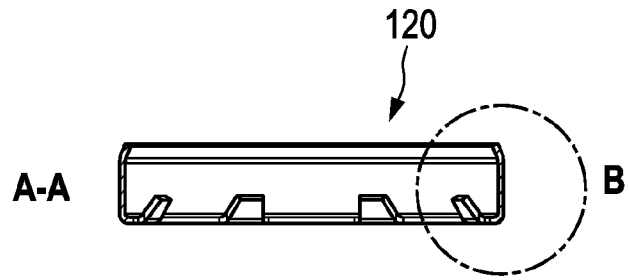
FIG. 15 is a view of the plane of section A-A in FIG. 14

FIG. 14 shows a plan view of the securing means 120, FIG. 15 shows a view of the plane of section A-A of FIG. 14 and FIG. 16 shows the enlarged detail B of FIG. 15.

The securing means according to the invention can be produced either from sheet metal strips, generally material strips, alternatively from pipes, circular blanks or as injection-molded components. The sheet metal strips, pipes or circular blanks may, for example, be produced from spring steel, aluminum or carbon steel. Additional materials, such as metals, non-ferrous metals, plastics materials and hybrid materials, can be used to produce the securing means according to the invention. Particularly plastics materials can be coated in order to obtain more grip and adhesion, in particular between a securing means and a workpiece hole or bush, in which the securing means is inserted. Depending on the environmental requirement, in particular mechanical requirements, corrosive ambient temperature, optimum adaptation of the securing means can thus be obtained.

Figure 17:
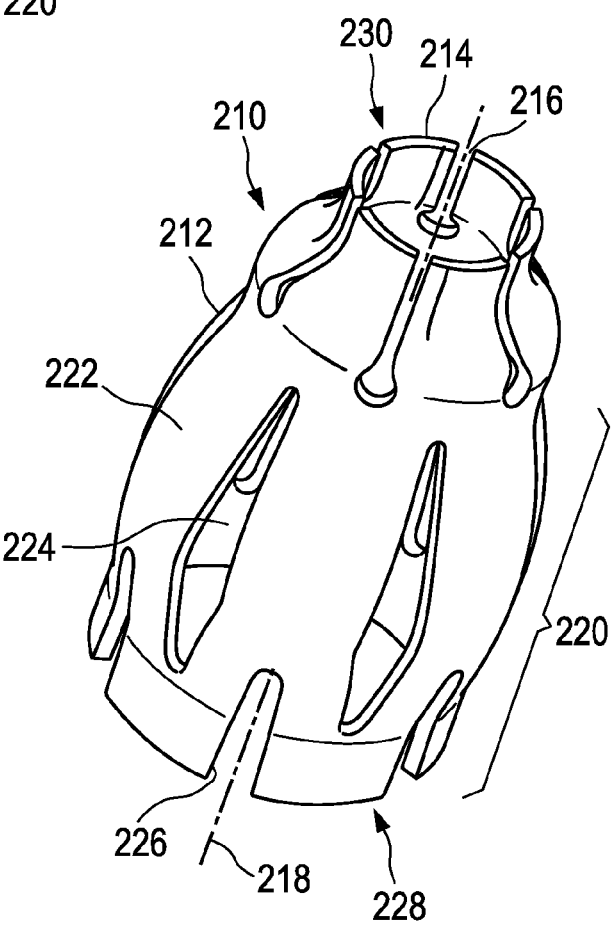
FIG. 17 is an oblique plan view of a securing means according to an additional embodiment of the invention.

FIG. 17 shows an additional securing means 210 according to the invention as an oblique plan view. The securing means 210 is constructed as an annular bush and has a portion 212 which is constructed as a closed ring. From this portion 212, the diameter of the bush decreases to an end 230 which is illustrated at the top right in FIG. 17 with a smaller diameter of the bush. This reduced diameter is achieved by a total of six resilient tongues 214 which extend from the portion 212 and which are separated from each other by incisions 216. The incisions 216 extend from the end 230 of the securing means 210 as illustrated at the top right in FIG. 17, extend as far as the annular portion 212 and have a circle-portion-like end. The resilient tongues 214 initially extend from the portion 212 parallel with a longitudinal center axis 218 of the securing means 210, cf. also FIG. 18, then run obliquely toward the longitudinal center axis 218 and then run as far as the free end thereof, again parallel with the longitudinal center axis 218.

The securing means 210 has a structure in the form of an annular cage 220 starting from the portion 212 in the direction toward the first end 228, which is illustrated at the bottom left in FIG. 17 and which has a greater diameter, of the securing means 210. This annular cage 220 has a convex-curved shape and comprises a total of six struts 222 which are separated from each other by slot-like recesses 224. The recesses 224 begin directly adjacent to the portion 212 and terminate in front of the end 228 of the securing means 210 arranged at the bottom left in FIG. 17. The struts 222 also begin at the portion 212 and run as far as the free end 228 of the securing means 210 illustrated at the bottom left in FIG. 17. After the end of the recesses 224, two respective adjacent struts 222 are connected to each other. Starting from the end 228 of the securing means 210 illustrated at the bottom left in FIG. 17, a total of six incisions 226 extend slightly in the direction toward the portion 212. In this case, the incisions 226 extend slightly between the recesses 224 and each incision 226 is arranged centrally between two recesses 224. In a manner adjacent to the end 228 of the recesses 224 illustrated at the bottom left in FIG. 17, the struts extend parallel with the longitudinal center axis 218. In a manner adjacent thereto, the struts 222 extend in a convex-curved manner or in an outwardly curved manner as far as the portion 212. As a result of the bulging shape of the struts 222, the recesses 224 and the incisions 226, the securing means 210 can be compressed in the region of the annular cage 220, for example in order to be able to be inserted into a hole having a smaller diameter. In this case, the annular cage 220 is provided to be compressed resiliently inwardly and thereby to apply a pretension which acts radially outwardly in order to be fixedly clamped in a hole.

The diameter of the securing means 210 is greater at the first end 228 which is illustrated at the bottom left in FIG. 17 than at the portion 212. At the second end 230 illustrated at the top right in FIG. 17, the diameter of the securing means 210 is then again smaller than in the portion 212. The end 230 of the securing means illustrated at the top right in FIG. 17 is provided to abut the shaft of a screw which is intended to be secured, cf. also FIGS. 20 to 22.

Figure 18:
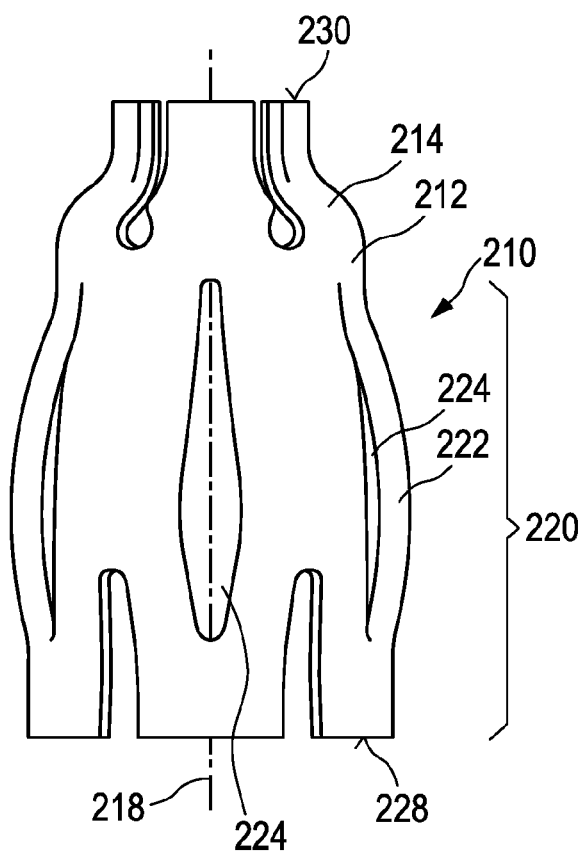
FIG. 18 is a side view of the securing means of FIG. 17.

FIG. 18 shows a side view of the securing means 210. It can clearly be seen that the diameter of the securing means 210 starting from a first end 228 initially increases slightly in the region of the annular cage 220. This is brought about by the convex, outwardly bulging shape of the struts 222. Approximately half-way along the annular cage 220, the diameter of the securing means 210 again decreases in order to then assume a smaller value than the first end 228 in the portion 212. As described, the resilient tongues 214 extend from the portion 212 in the direction toward the upper end 230 in FIG. 18. FIG. 18 clearly shows that the resilient tongues 214 starting from the portion 212 which is in the form of a closed ring initially taper toward the longitudinal center axis 218 so as to be curved outwardly in a convex manner, then are curved in a concave manner again in a direction parallel with the longitudinal center axis 218 in order to then extend parallel with the longitudinal center axis 218 as far as the second end 230. The diameter at the second end 230 is smaller than in the portion 212.

As set out, the diameter of the securing means 210 at the first end 228 is greater than at the annular portion 212 and the annular portion 212 has a greater diameter than the second end 230. A hole in which the securing means 210 is inserted should have a diameter which is greater than the outer diameter of the portion 212 and is slightly smaller than the diameter at the first end 228 or approximately as large as the diameter at the first end 228. During insertion into such a hole, the annular cage 220 is thereby compressed so that the securing means 210 is fixed relative to the hole. A screw which is intended to be secured with the securing means 210 so as to prevent it from falling out of the hole is advantageously intended to have a shaft portion having a diameter which is smaller than or precisely as large as the inner diameter at the second end 230, and an additional shaft portion, generally a threaded portion, the outer diameter of which is greater than the inner diameter at the second end 230. The securing means 210 can thereby secure such a screw so as to prevent it from falling out of the hole and the screw can nevertheless be displaced relative to the securing means 210 in and counter to the longitudinal center axis thereof.

Figure 19:
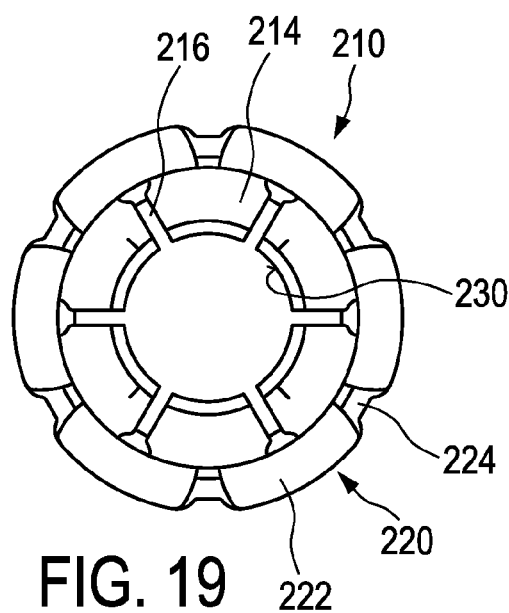
FIG. 19 is a plan view of the securing means of FIG. 17.

FIG. 19 shows the securing means 210 of FIG. 17 as a plan view. Therefore, the view in FIG. 19 is toward the upper end 230 in FIG. 18. The resilient tongues 214, which are separated from each other by the incisions 216, can clearly be seen. Furthermore, FIG. 19 shows the annular cage 220 with the struts 222 and the recesses 224 between the struts 222. The lower end 228 of the securing means 210, see FIG. 17 and FIG. 18, is covered in FIG. 19.

Figure 20:
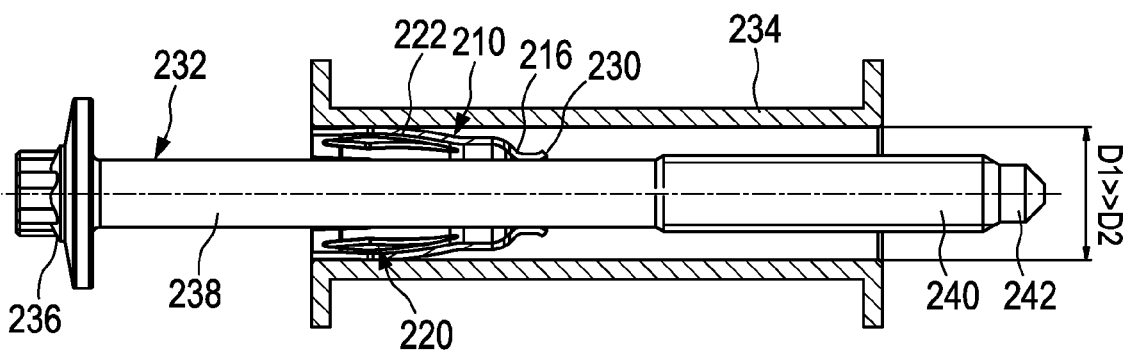
FIG. 20 shows the securing means of FIG. 17 in the fitted state as a mounting unit with a screw in a first position.

FIG. 20 shows the securing means 210 of FIGS. 17 to 19 in the fitted state. The securing means 210 has been inserted into a bush 234 which has a cylindrical hole having the diameter D1 and, at the left end and right end thereof in FIG. 20, a collar which projects in a radial direction. The bush 234 can, for example, be inserted into a workpiece in that it is injection-molded therein during the production of the workpiece. For example, hoods, covers or the like can be provided with the bush 234. It has already been set out that the securing means 210 can generally be inserted in holes, in which screws are intended to be secured. Such holes can also be drilled in solid workpieces or be provided in bushes which are then fixed in a suitable manner in or on the workpiece.

The illustration of FIG. 20 shows a machine screw 232 which is partially introduced into the hole of the bush 234. The screw 232 has a head 236, a smooth, threadless shaft portion 238 and a threaded portion 240. There is further provided between the end of the threaded portion 240 and the free end opposite the head 236 a threadless portion 242 with an outer diameter which is reduced relative to the thread 240 and a frustoconical tip. This portion 242 serves to be able to introduce the screw 232 as easily as possible into a threaded hole, even if the screw 232 is slightly offset in a radial direction relative to the threaded hole.

The head 236 has an outer diameter which is greater than the inner diameter D1 of the hole in the bush 234. In a direction from left to right in FIG. 20, the screw 232 consequently cannot fall out of the bush 234. The outer diameter of the smooth shaft portion 238 which adjoins the head 236 is smaller than the outer diameter of the threaded portion 240. Since the inner diameter D1 of the hole in the bush 234 is greater than, in the embodiment illustrated approximately twice as large as, the outer diameter of the threaded portion 240, the screw 232 in FIG. 20 could fall out of the bush 234 to the left if the securing means 210 were not provided. The resilient tongues 216 of the securing means 210 abut the outer circumference of the smooth shaft portion 238 of the screw 232 with the regions thereof which extend from the second end 230 of the securing means 210 and which extend parallel with the longitudinal center axis of the securing means 210.

Even if the resilient tongues 216 abut the shaft portion 238 with a specific resilient pressure, the screw 236 in FIG. 20 can still be displaced to the left and right relative to the bush 234. The screw 236 is prevented from falling out in a direction to the left in FIG. 20 in that, when the screw 236 is displaced from the position of FIG. 20 to the left relative to the bush 234, the left end of the threaded portion 240 abuts the second end 230 of the securing means 210 and the screw 236 is prevented from moving out further to the left from the bush 234.

In this case, the securing means 210 is not itself pulled out of the hole of the bush 234 because the securing means 210 is retained in the region of the annular cage 220 in a frictionally engaging manner in the hole of the bush 234. This is achieved in that the struts 222 apply a pretensioning force outward. The struts 222 can additionally be provided on the outer side thereof with a coating which brings about a greater grip or higher adhesion between the struts 222 and the hole of the bush 234.

Starting from the state of FIG. 20, the screw 236 can be displaced in a radial direction relative to the hole of the bush 234. Tolerances between a position of the bush 234 and a position of a threaded hole, in which the thread 240 of the screw 236 is intended to be screwed, can thereby be compensated for. FIG. 20 shows that the screw 236 can be displaced in a radial direction, that is to say upward or downward in FIG. 20, until the outer diameter of the thread 240 abuts the inner wall of the hole of the bush 234. Such radial displacement is allowed by the securing means 210, as can be seen, for example, in FIG. 22. To this end, the securing means 210 has a plurality of, in particular six, resilient tongues 214 which are distributed uniformly over the circumference of the securing means. In the context of the invention, at least the resilient tongues which are uniformly distributed over the circumference are intended to be provided in order to allow a radial movability of the shaft of a screw.

FIG. 20 shows the securing means 210 in a state arranged in the bush 234 which has an inner diameter D1. This inner diameter D1 is greater than a diameter D2 of a hole of a bush 244 which is illustrated in FIG. 21.

Figure 21:
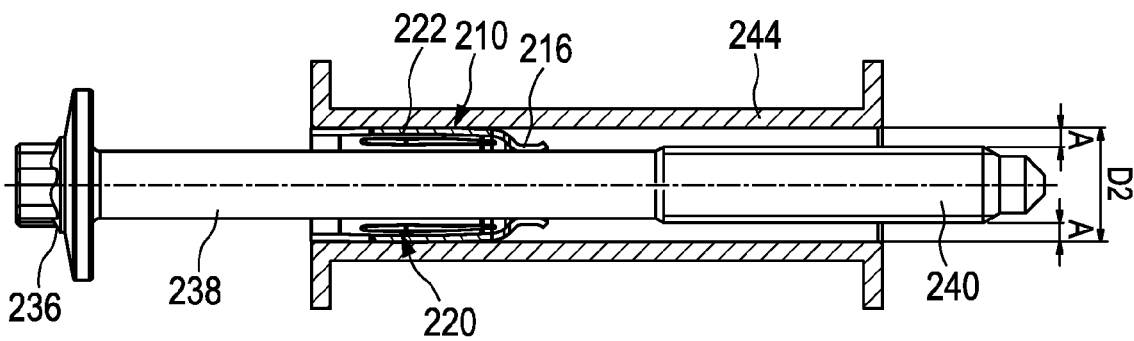
FIG. 21 shows the securing means of FIG. 17 in the fitted state as a mounting unit with a screw in a second position and FIG. 22 shows the securing means of FIG. 17 in the fitted state as a mounting unit with a screw in a third position.

FIG. 21 shows the screw 236 and the securing means 210 which are inserted in the hole of the bush 244 with the inner diameter D2. As already set out, the inner diameter D2 is smaller than the inner diameter D1 of the hole of the bush 234 of FIG. 20.

The securing means 210 abuts with the resilient tongues 216 thereof the outer periphery of the threadless, smooth shaft portion 238 of the screw 236 again and thereby prevents the screw 236 in FIG. 21 from being able to be pulled out of the bush 244 from right to left. As a result of the smaller inner diameter D2 of the hole of the bush 244, the struts 222 in the region of the annular cage 220 of the securing means 210 are compressed more powerfully than in the state of FIG. 20. In an unchanged manner, however, the struts 222 cause, as a result of the radially outwardly acting resilient pretensioning thereof, the securing means 210 to be fixed securely in a frictionally engaging manner in the hole of the bush 244. The screw 236 can be displaced from the state illustrated in FIG. 21 in a radial direction relative to the hole of the bush 244, that is to say in FIG. 21 upward and downward. The amount of this possible displacement, in FIG. 21 upward and downward, is indicated in FIG. 21 with the letter A.

Figure 22:
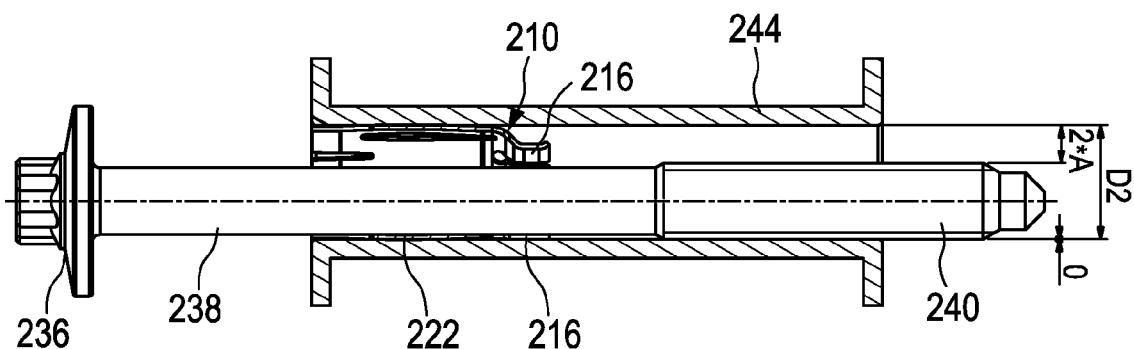

FIG. 22 shows the screw 236 in the bush 244 of FIG. 21, wherein the screw 236 has been displaced, however, with respect to the state of FIG. 21 in a radial direction by the length A, therefore in FIG. 22 downward. The thread 240 now abuts at one side the inner wall of the hole of the bush 244. This is illustrated in FIG. 22 at the bottom. The thread 240 now has a spacing of 2A from the opposing wall portion (illustrated at the top in FIG. 22) of the hole of the bush 244. In this state of FIG. 22, the screw 236 can also further be screwed into a threaded hole. The securing means 210 therefore ensures, on the one hand, that the screw 236 cannot slide out of the bush 244 and, on the other hand, allows tolerances to be compensated for between a position of the bush 244 and the position of a threaded hole which is not illustrated and in which the screw 236 is intended to be introduced. Furthermore, the securing means 210 can also compensate for tolerances in the inner diameter D1, D2 of a hole or sleeve 234, 244.

For example, the bushes 234, 244 can be injection-molded into a plastics hood during the production thereof. If the plastics hood is then placed, for example, on a machine housing or on a cylinder head, the securing means 210 can compensate for tolerances between the position of the threaded holes and the position of the bushes 234, 244 in the plastics hood. The securing means 210 can further also compensate for tolerances of the inner diameter of the holes in the bushes 234, 244.

In the state of the screw 236 radially redirected to the maximum extent relative to the bush 244, as illustrated in FIG. 22, the resilient struts 216 and the struts 222 of the securing means 210 at one side are completely pressed flat. At the opposite side which is illustrated in FIG. 22 at the top, the resilient tongues or a resilient tongue 216 are no longer on the shaft portion 238 of the screw 236. In the state of FIG. 22, however, the securing means 210 also still ensures that the screw 236 cannot be pulled out of the bush 244, that is to say to the left in FIG. 22, and the securing means 210 is still fixed by the struts 222 in the hole of the bush 244.

There are several possible ways of introducing the securing means 210 into the hole of the bushes 234, 244. For example, the securing means 210 can initially be inserted without the screw 236 into the hole of the bush 234, 244. Only then can the screw 236 be inserted into the securing means 210. During this insertion, the resilient tongues 216 are deflected radially outward until the thread 240 has passed the resilient tongues 216. The resilient tongues 216 then spring back inwardly into the position illustrated in FIG. 20 or 21.

Alternatively, the securing means 210 can also be fitted initially on the shaft of the screw 236. To this end, the screw 236 is simply inserted from the end 228 into the securing means 210. In this case, the resilient tongues 216 are deflected radially outwardly again and then spring back inwardly when the thread 240 of the screw 236 has passed the resilient tongues 216. Together with the screw 236, the securing means 210 can then be inserted into the hole of the bush 234, 244 and positioned.

The securing means 210 can also be referred to as a resilient tongue sleeve.

In the embodiment of FIGS. 20 to 22, the resilient tongues 216 of the securing means 210 are located on the threadless and smooth shaft portion 238. A securing means can also be produced in that the resilient tongues 216 are positioned on the thread of a screw and the screw can, for example, also have in the shaft thereof a circumferential groove, in which the resilient tongues 216 can then engage.

The invention claimed is:

1. A securing means for a screw having an annular sleeve for insertion in a through-hole in a first workpiece, the annular sleeve configured to allow radial and axial displacement of the screw relative to the through-hole to secure the first workpiece to a second workpiece, wherein the annular sleeve is provided with at least one plate-like resilient tongue which extends from the annular sleeve and which projects in the direction toward a longitudinal center axis of the sleeve, wherein the annular sleeve has an annular cage having a plurality of struts, wherein the struts are resiliently compressed during insertion of the annular sleeve into the through hole by displacing the struts inward in a radial direction such that the struts will exert pressure outward in the radial direction after insertion in order to fix the securing means in the through-hole, wherein at least one plate-like resilient tongue extends from the annular sleeve initially parallel with the longitudinal center axis of the sleeve, then obliquely relative to the longitudinal center axis toward the longitudinal center axis and, at least up to a location just in front of the free end of the plate-like resilient tongue, again parallel with the longitudinal center axis.

2. The securing means as claimed in claim 1, wherein the annular sleeve has a slot which is continuous from a first edge to a second edge.

3. The securing means as claimed in claim 1, wherein the annular sleeve has a portion which forms a closed ring.

4. The securing means as claimed in claim 1, wherein at least three plate-like resilient tongues are distributed uniformly over the circumference of the annular sleeve.

5. The securing means as claimed in claim 1, wherein, directly in front of the again parallel portion, at the free end thereof, the at least one plate-like resilient tongue extends obliquely relative to the longitudinal center axis away from the longitudinal center axis.

6. The securing means as claimed in claim 1, wherein the annular sleeve and the at least one resilient tongue are formed from a high-grade steel plate, from a metal, from a non-ferrous metal, from a plastics material or from a hybrid material.

7. The securing means as claimed in claim 1, wherein the at least one resilient tongue extends from a first edge of the sleeve and in that the sleeve is provided in the region of a second edge which is opposite the first edge with at least one projection which projects radially outwardly away from the longitudinal center axis.

8. The securing means as claimed in claim 1, wherein the annular sleeve is bent from a band-like material strip.

9. The securing means as claimed in claim 8, wherein an intermediate space is located between the beginning and the end of the band-like material strip in the finished state of the annular sleeve.

10. The securing means as claimed in claim 1, wherein the sleeve has a portion which forms a closed ring, wherein, when viewed in the direction of a longitudinal center axis of the ring, the at least one resilient tongue extends from the portion which forms the closed ring, and wherein a longitudinal extent of the resilient tongue is from one time to three times the length of the portion forming the closed ring.

11. The securing means as claimed in claim 1, wherein two resilient tongues which are arranged beside each other in a circumferential direction are separated from each other by means of an incision in the sleeve.

12. A mounting unit having a screw, a bush first workpiece and a securing means as claimed in claim 1, wherein the securing means is inserted in the bush and the screw extends at least partially into the bush and is retained in the bush by the securing means.

13. A mounting unit having a screw, a sheet metal first workpiece and a securing means as claimed in claim 1, wherein the securing means and the screw are inserted in a through-opening of the sheet metal component.

14. A method for mounting a screw and a securing means as claimed in claim 1 in a through-hole of a first workpiece, wherein initially the securing means is pushed on the shaft of the screw and then the securing means is inserted together with the screw into the through-hole and positioned.

* * * * *